Patented Oct. 11, 1949

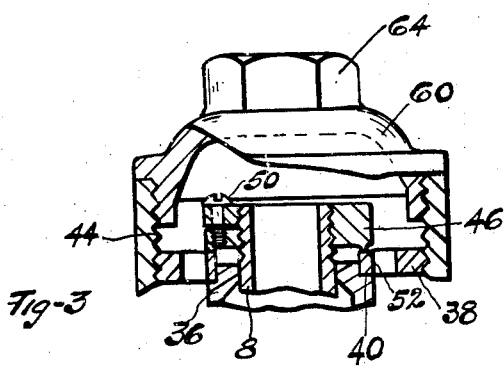
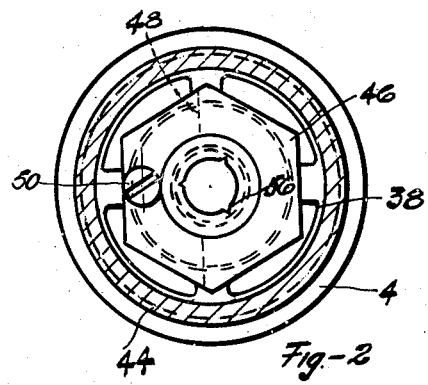
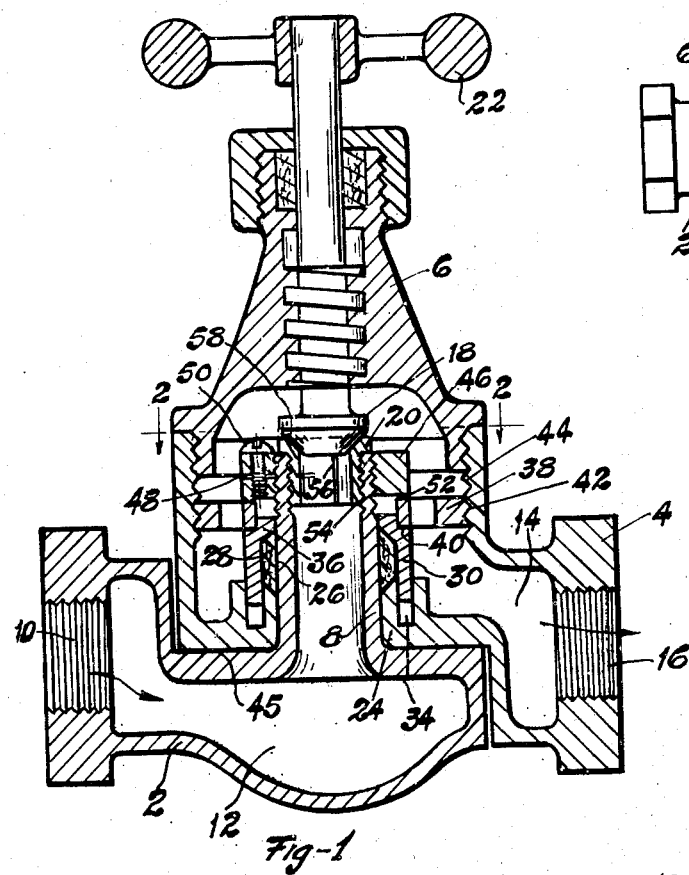
Oct. 11, 1949.  J. O'SHAUGHNESSY  2,484,354
ADJUSTABLE PIPE CONNECTION
Filed Oct. 22, 1945
INVENTOR.
JOHN O'SHAUGHNESSY
BY Albert T Sperry.

2,484,354

UNITED STATES PATENT OFFICE 2,484,354

ADJUSTABLE PIPE CONNECTION

John O'Shaughnessy, Trenton, N. J.

Application October 22, 1945, Serial No. 623,707

5 Claims. (Cl. 251—157)

My invention relates to valves, unions, couplings, and similar pipe connections and particularly to constructions which are adapted to be connected to pipes which extend at various angles to each other or are movable from one position to another during use.

Pipe couplings having parts which are movable from one position to another have been produced heretofore but they have not generally been so constructed that they will withstand appreciable pressure without leaking or they have included elements which are forced together when subjected to pressure so that considerable friction is developed resisting relative movement thereof. Such prior devices also have been complicated and expensive in construction and difficult to produce and assemble.

In accordance with my invention these objections to constructions of the prior art are overcome and means are provided which are simple and economical to produce and are capable of being subjected to high pressure without leaking. In the preferred forms of my invention herein shown and described the elements are provided with packing means operable to prevent leakage and yet so arranged that they are not influenced by pressure to which the device is subjected. In this way friction between the relatively movable elements is independent of the pressure under which the device is operated and the packing may be installed and tested without danger of alteration during assembly or use.

One of the objects of my invention is to provide a novel type of fitting for affording connection between pipes extending at various angles to each other.

Another object of my invention is to provide a pipe coupling, valve or the like embodying relatively movable parts with a packing therebetween which is not affected by pressures to which the device is subjected.

A further object of my invention is to provide a leak proof adjustable valve or coupling which is economical to produce and assemble.

These and other objects and features of my invention will appear from the following description thereof in which reference is made to the figures of the accompanying drawing.

In the drawing:

Fig. 1 is a vertical sectional view through a typical form of valve construction embodying my invention.

Fig. 2 is a horizontal sectional view of the construction illustrated in Fig. 1 taken on the line 2—2 thereof.

Fig. 3 is a view partly in section and partly in elevation illustrating a portion of an alternative construction embodying my invention, and Fig. 4 is a top plan view of that form of my invention illustrated in Fig. 3.

In that form of my invention shown in Figs. 1 and 2 the device comprises a valve body including an inlet member 2 and an outlet member 4 with a valve bonnet 6 secured to the outlet member of the assembly. The inlet member 2 is formed with a central tubular shank 8 which communicates with the inlet opening 10 through the chamber 12. The upper end of the shank 8 communicates with the chamber 14 in the outlet member 4 through which liquid passes to the outlet opening 16. Flow of liquid through the valve members is controlled by the valve 18 which is movable toward and away from the valve seat member 20 on the tubular shank 8 by operation of the handle 22.

The outlet member 4 is formed with a central bearing portion 24 which surrounds the shank 8 of the inlet member and fits closely adjacent thereto while permitting relative rotation of the inlet and outlet members of the structure so that it may be connected to pipes which extend in different directions or to pipes which are movable during use. The portions of the inlet and outlet members adjacent the inlet and outlet openings are so formed that the members may be moved through an arc of about 300°. The device therefore may be applied in substantially any location and may move to take up expansion in the pipes to which it is connected or to allow movement of the pipes during use.

The outer surface of the tubular shank 8 of the inlet member is formed with a smooth cylindrical surface 26 engageable by a packing 28 which is held in place by means of a sleeve 30. The lower end of the sleeve 30 extends into an annular recess 34 in the outlet member 4 whereas the upper portion 36 of the sleeve extends inward over the packing 28 to compress the packing and force it inward against the smooth outer surface of the shank 8 so as to prevent leakage along the surface 26. The sleeve 30 is thus supported at its opposite ends so as to resist radially directed forces which otherwise would be applied to the packing when the valve is subjected to pressure.

The packing 28 is compressed and held in place by means of a retaining ring 38 which engages the shoulder 40 on the sleeve 30 adjacent the upper end thereof. The retaining ring 38 is threaded at 42 for engagement with complementary threads 44 on the inner surface of the upper portion of the outlet member 4, so that the sleeve 30 and retaining ring 38 are carried by the outlet member while the packing 28 engages only the smooth outer surface 26 of the shank 8 of the inlet member.

The inlet member 2 is preferably assembled with the outlet member so that the flat lower face 45 of the annular portion of the outlet member bears against or is closely adjacent the upper face of the portion of the inlet member surrounding the shank 8. The members are held against axial displacement by means of the retaining nut 46 which is threaded onto the upper end of the tubular shank 8 of the inlet member in position to engage the inner edge of the retaining ring 36 carried by the outlet member and hold the members in position against the action of pressure of fluid supplied to the valve. The retaining nut 46 is in the form of a lock nut which is split transversely at 48 throughout a portion only of its circumference and is distorted by means of the screw 50 for locking the retaining nut securely in place on the shank 8 of the inlet member after the parts have been properly packed and assembled.

As shown, the lower face of the retaining nut is formed with a narrow annular bearing surface 52 of relatively small cross section for the purpose of limiting the area of contact between the retaining nut 46 and the retaining ring 36 while permitting relative rotation thereof with the members 2 and 4 of the valve.

With this construction axial movement of the body members of the valve is prevented by engagement of the retaining nut 46 with the retaining ring 36 and the pressures to which the valve is subjected are not transmitted to the packing. Moreover, the surface sealed by the packing is parallel to the direction of thrust of the retaining nut on the retaining ring so that this thrust is taken up by the retaining ring and is not transmitted to the packing sleeve 30. Therefore there is no increase or variation in the action of the packing on the shank 8 when the structure is subjected to pressure. The packing then can be secured in place and an effective seal can be established which will not thereafter be influenced by the pressure of fluid within the valve.

In the construction shown in Figs. 1 and 2 the valve seat member 20 is formed as a separate element which is threaded externally for engagement with threads 54 on the inner surface of the upper end of the shank 8. A slot 56 is provided on the inner face of the valve seat member to receive a wrench for applying and removing the valve seat member. The valve 18 is formed with a conical surface 58 for engaging the complementary surface of the valve seat. However, it will be apparent that any other suitable form of valve and valve operating means may be used if desired.

In the construction illustrated in Fig. 3 the bonnet 6 of the device illustrated in Fig. 1 is replaced by a closure plate 60 which engages the threads 44 on the inner surface of the upper portion of the outlet member 4. The cover member 60 is provided with a hexagonal projection 64 for securing the cover to the outlet member after the packing and retaining elements have been secured in place.

When using either form of my invention the outlet member of the body members is relatively movable from the full line position of Fig. 1 to various alternative positions as shown in dotted lines in Fig. 4. The inlet and outlet members therefore can be connected to pipes extending at different angles to each other and they may move after installation to allow for expansion of the pipes to which the members of the valve are connected or to permit these pipes to be adjusted in position during use. Moreover, the packing and sealing of the members to prevent leakage may be accomplished easily and the device may be tested before the valve bonnet or cover plate is applied to the assembly. The packing when once secured in place will be unaffected by the pressure to which the device is subjected and therefore the friction between the parts is not materially increased and the packing is not destroyed or subject to change by reason of variation in such pressure.

While I have illustrated and described a preferred form of my invention it will be understood that it is adapted for use in many and varied relations and the elements employed are capable of numerous changes in form and construction without departing from the spirit of my invention. In view thereof it should be understood that the forms of my invention herein shown and described are intended to be illustrative only and are not intended to limit the scope of my invention.

I claim:

1. A fitting for application to pipes comprising an inlet member formed with a tubular shank having an open end through which fluid may pass, an outlet member having a portion surrounding said shank and rotatably mounted thereon, said outlet member having a passage communicating with the tubular shank for discharge of fluid from the fitting, a packing surrounding the tubular shank to seal the space between said members, a packing sleeve movable parallel to said shank for compressing the packing, a retaining member having threaded engagement with the outlet member and bearing against said sleeve to position the sleeve and compress the packing, means engaging the retaining member for preventing relative axial movement of the inlet and outlet member said outlet member being in the form of a housing extending over the open end of said shank and provided with an opening therein through which said packing, sleeve and retaining means may be passed for assembly of the fitting, and a closure plate for said opening in threaded engagement with the outlet member.

2. A valve comprising two body members, one of which embodies a tubular shank with a valve seat on the end thereof, and the other of which surrounds said shank and is rotatably mounted thereon, means forming a passage extending through said body members and shank, a valve carried by one of said members and movable into and out of engagement with said valve seat, packing engaging the outer surface of said shank, a sleeve surrounding said packing to hold it in place, retaining means in threaded engagement with one of said members for holding said sleeve in place, and means carried by said shank and engaging said retaining means for preventing relative axial displacement of said members.

3. A valve comprising two body members, one of which embodies a tubular shank with a valve seat on the end thereof, and the other of which surrounds said shank and is rotatably mounted thereon, means forming a passage extending through said body members and shank, a valve carried by one of said members and movable into and out of engagement with said valve seat, packing engaging the outer surface of said shank, a sleeve surrounding said packing to hold it in place, retaining means in threaded engagement with one of said members for holding said sleeve in place, and a lock nut secured to said shank and engaging said retaining means to prevent relative axial displacement of said members.

4. A valve comprising a body member having a tubular shank with an open end and formed with a passage therein communicating with said shank, a second body member having a bearing portion surrounding said shank and rotatably mounted thereon, said second body member having a passage therein which is open adjacent the open end of said shank, a valve bonnet mounted on said second body member and having a valve member movable into and out of engagement with the open end of said shank to control the flow of fluid through said passages, packing surrounding said shank, a sleeve engaging said packing, a retaining ring having threaded engagement with said second member and bearing against said sleeve to hold the sleeve and packing in place, and means for preventing relative axial displacement of said body members.

5. A valve comprising a body member having a tubular shank with an open end and formed with a passage therein communicating with said shank, a second body member having a bearing portion surrounding said shank and rotatably mounted thereon, said second body member having a passage therein which is open adjacent the open end of said shank, a valve bonnet mounted on said second body member and having a valve member movable into and out of engagement with the open end of said shank to control the flow of fluid through said passages, packing surrounding said shank, a sleeve engaging said packing, a retaining ring having threaded engagement with said second member and bearing against said sleeve to hold the sleeve and packing in place, and means carried by said shank and engaging said retaining ring to prevent relative axial displacement of said body members.

JOHN O'SHAUGHNESSY.

REFERENCES CITED

The following references are of record in the file of this patent:

UNITED STATES PATENTS

| Number | Name | Date |
| --- | --- | --- |
| 401,262 | Frisbie | Apr. 9, 1889 |
| 655,315 | Vaughn | Aug. 7, 1900 |
| 1,019,922 | Schaffnet | Mar. 12, 1912 |
| 1,178,999 | Fleming | Apr. 11, 1916 |
| 1,518,221 | Reiber | Dec. 9, 1924 |
| 1,841,789 | Connolly | Jan. 19, 1932 |
| 2,300,584 | Martin | Nov. 3, 1942 |
| 2,313,322 | Carpenter | Mar. 9, 1943 |